United States Patent
Schweinbenz et al.

(10) Patent No.: US 10,044,020 B2
(45) Date of Patent: Aug. 7, 2018

(54) CELL CONNECTOR FOR A BATTERY SYSTEM OR FOR A BATTERY CELL OF AN ELECTRICAL ENERGY STORE, BATTERY AND MOTOR VEHICLE

(71) Applicants: Robert Bosch GmbH, Stuttgart (DE); Samsung SDI Co., Ltd., Yongin-si, Gyeonggi-do (KR)

(72) Inventors: Jochen Schweinbenz, Stuttgart (DE); Klaus Wipfler, Niefern-Oeschelbronn (DE); Markus Kohlberger, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 611 days.

(21) Appl. No.: 14/388,732

(22) PCT Filed: Jan. 30, 2013

(86) PCT No.: PCT/EP2013/051774
§ 371 (c)(1),
(2) Date: Sep. 26, 2014

(87) PCT Pub. No.: WO2013/143720
PCT Pub. Date: Oct. 3, 2013

(65) Prior Publication Data
US 2015/0171413 A1    Jun. 18, 2015

(30) Foreign Application Priority Data
Mar. 28, 2012   (DE) ................ 10 2012 205 021

(51) Int. Cl.
*H01M 2/34* (2006.01)
*H01M 2/20* (2006.01)
(Continued)

(52) U.S. Cl.
CPC ........... *H01M 2/348* (2013.01); *H01M 2/202* (2013.01); *H01M 2/206* (2013.01); *H01M 2/26* (2013.01);
(Continued)

(58) Field of Classification Search
CPC ........ H01M 2/02; H01M 2/202; H01M 2/206; H01M 2/26; H01M 2/348
See application file for complete search history.

(56) References Cited

U.S. PATENT DOCUMENTS

| | | | | |
|---|---|---|---|---|
| 2,729,802 A | * | 1/1956 | Jordan | H01R 11/287 439/217 |
| 4,117,211 A | * | 9/1978 | Schuster | H01M 2/06 429/121 |

(Continued)

FOREIGN PATENT DOCUMENTS

| CN | 1264913 A | 8/2000 |
|---|---|---|
| CN | 200993978 Y | 12/2007 |

(Continued)

OTHER PUBLICATIONS

International Search Report corresponding to PCT Application No. PCT/EP2013/051774, dated Mar. 13, 2013 (German and English language document) (7 pages).

*Primary Examiner* — Kenneth J Douyette
(74) *Attorney, Agent, or Firm* — Maginot, Moore & Beck LLP

(57) ABSTRACT

A cell connector for connecting lithium-ion battery cells of a lithium ion battery includes a body and a fuse.

8 Claims, 3 Drawing Sheets

(51) Int. Cl.
  *H01M 2/02*    (2006.01)
  *H01M 10/0525*  (2010.01)
  *H01M 2/26*    (2006.01)

(52) U.S. Cl.
  CPC .. *H01M 10/0525* (2013.01); *H01M 2200/103* (2013.01); *H01M 2220/20* (2013.01)

(56) References Cited

U.S. PATENT DOCUMENTS

| | | | |
|---|---|---|---|
| 6,377,432 B1 | 4/2002 | Hashimoto | |
| 2002/0098413 A1* | 7/2002 | Hulbert | H01H 85/044 429/178 |
| 2007/0099073 A1* | 5/2007 | White | H01M 2/1055 429/158 |
| 2008/0053716 A1* | 3/2008 | Scheucher | B60L 11/1861 180/2.1 |
| 2011/0148201 A1 | 6/2011 | Chuang | |
| 2011/0244280 A1* | 10/2011 | Byun | H01M 2/0404 429/61 |

FOREIGN PATENT DOCUMENTS

| | | |
|---|---|---|
| CN | 102208594 A | 10/2011 |
| DE | 10 2008 043 946 A1 | 5/2010 |
| DE | 10 2010 044 455 A1 | 3/2013 |
| EP | 1 780 819 A1 | 5/2007 |
| EP | 2 306 485 A1 | 4/2011 |
| EP | 2 372 808 A1 | 10/2011 |
| JP | 6-140020 A | 5/1994 |
| JP | 7-57613 A | 3/1995 |
| JP | 11-67184 A | 3/1999 |
| JP | 11-250950 A | 9/1999 |
| JP | 2000-311575 A | 11/2000 |
| JP | 2004-119383 A | 4/2004 |
| JP | 2005-235680 A | 9/2005 |
| JP | 2007-250301 A | 9/2007 |
| JP | 2009-87761 A | 4/2009 |
| JP | 2011-41368 A | 2/2011 |
| JP | 2011-60687 A | 3/2011 |
| JP | 2011-154991 A | 8/2011 |
| JP | 2012-15102 A | 1/2012 |
| JP | 2012-18904 A | 1/2012 |
| JP | 2013-73929 A | 4/2013 |

* cited by examiner

CELL CONNECTOR FOR A BATTERY SYSTEM OR FOR A BATTERY CELL OF AN ELECTRICAL ENERGY STORE, BATTERY AND MOTOR VEHICLE

This application is a 35 U.S.C. § 371 National Stage Application of PCT/EP2013/051774, filed on Jan. 30, 2013, which claims the benefit of priority to Serial No. DE 10 2012 205 021.3, filed on Mar. 28, 2012 in Germany, the disclosures of which are incorporated herein by reference in their entirety.

The present disclosure relates to a cell connector for a battery system or for a battery cell of an electrical energy store for the drive of a motor vehicle, wherein, in particular, lithium-ion battery cells are used as battery cells.

BACKGROUND

A cell connector, which is provided at least for one battery cell of an electrical energy store and which establishes the electrically conductive connection to an electric motor of an electric motor vehicle or of a hybrid vehicle or to further interconnected battery cells, has a region with a tapered cross section between its two contact ends, it additionally being possible for a permanent mechanical prestress to act on said tapered cross section.

In the event of a brief current flow which is increased owing to a short circuit, disconnection takes place at that point of the cell connector which has a weakened cross section and constitutes a fuse.

A battery cell or a plurality of battery cells of a battery system, which battery cell or battery cells serve to drive electric motor vehicles or hybrid vehicles, can emit operating voltages of up to 600 V, via high-voltage paths, to a drive system when connected to a battery system in the charged state, in particular when using lithium-ion battery cells. In the event of a disturbance in a defective lithium-ion battery cell, current flows of up to 1000 A may briefly occur, these possibly leading to irreversible damage to the entire drive system and/or further lithium-ion battery cells which are interconnected in a cell composite. A damaged lithium-ion battery cell therefore has to be disconnected from the battery system by the shortest route in order to avoid consequential damage to an electrical energy store or to a drive system of an electric motor vehicle or of a hybrid vehicle.

DE 10 2008 043 946 A1 discloses a safety device for a rechargeable battery cell which has an electrode group which is arranged in an elastic cell sheathing and has at least one electrical connection. The safety device is designed, in principle, in such a way that a locking element is provided, which locking element locks at least one first electrical contact, which is associated with the electrical connection, in a releasable electrical connection to at least one second electrical contact, wherein the locking element is designed to release the releasable electrical connection in the event of an expansion in the cell sheathing due to a change in volume of the rechargeable battery cell during operation, in order to allow the second contact to be disconnected from the first contact.

SUMMARY

The disclosure proceeds from a cell connector for a battery system, comprising a large number of lithium-ion battery cells, wherein a cell connector has a respectively associated fuse.

This has the advantage that, in the event of a sudden disturbance in a defective lithium-ion battery cell, a short-circuit current which occurs cannot be conducted further into a drive system of an electric motor vehicle or of a hybrid vehicle or into further interconnected lithium-ion battery cells. In this case, the fuse instantaneously interrupts the otherwise still existing electrical contact.

The fuse is accordingly designed such that a region of the cell connector which is arranged between the two contact ends is arranged with a tapered portion or a cutout.

As a result, the cell connector can be interrupted at this point in the event of a sudden short circuit in a lithium-ion battery cell, so that further damage to further lithium-ion battery cells which are connected to a defective lithium-ion battery cell or damage in the direction of a drive system can be suppressed.

A further design of the fuse with the additional effect of mechanical vibration compensation in the cell connector can be created by the cell connector having a compensation element in the form of a convex portion, and the cutout not being situated in the region of the compensation element.

As a result, vehicle vibrations can be better compensated for and the cell connector is not put at risk by possible material fatigue at its point of weakened cross section comprising the cutout which constitutes the fuse.

Another way of integrating a fuse according to the disclosure in a cell connector may involve said fuse being a constituent part of a cell connector which is in the form of a cable or fabric connector. In this way, it is possible to make even better use of the installation space in a battery cell module or in a battery system.

The cell connector can further be present with a property of such a kind that, when the two contact ends are separated by the fuse, the respectively created fractions move away from one another.

This has the advantage that skipping of a short circuit by the formation of an arc is avoided.

In addition, provision can be made in one of the above-described designs of a cell connector with a fuse for the region, which exhibits the fuse, in the cell connector to have a plastic sheathing. This protects against corrosion and provides additional insulation, for example with respect to adjacent battery cell housings.

Finally, in conclusion, it should be noted that a battery having a large number of lithium-ion battery cells which are electrically connected to one another and having a cell connector of the kind described according to the disclosure can be present.

BRIEF DESCRIPTION OF THE DRAWINGS

Embodiments of the disclosure will be explained in greater detail with reference to the drawings and the following description. In the drawings.

DETAILED DESCRIPTION

Figure 1:
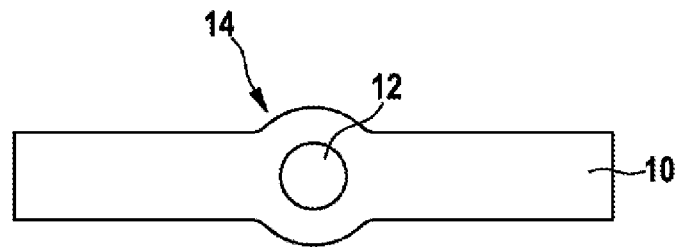
FIG. 1 shows a cell connector having a cutout.

A cell connector 10 having a cutout 12 which is made in it is illustrated in FIG. 1. The weakened portion of the conductor cross section of the cell connector 10, which weakened portion is created at the cutout 12, provides the region of a fuse 14 in this way.

Figure 2:
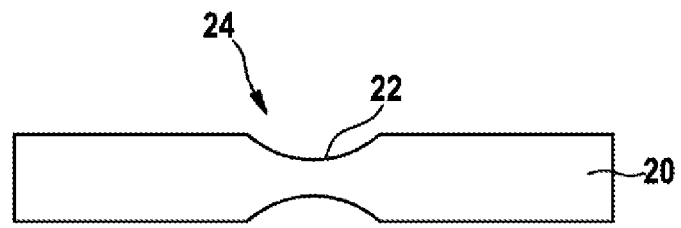
FIG. 2 shows a cell connector having a tapered portion.

In FIG. 2, the cell connector 20 has a tapered portion 22 in a defined region, said tapered portion, in a similar way to in FIG. 1, constituting a weakened portion of the conductor cross section of the cell connector 20 and in this way acting as fuse 24.

Figure 3:
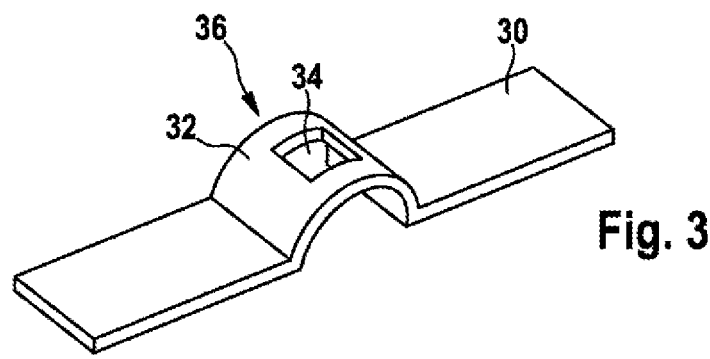
FIG. 3 shows a cell connector having a convex portion and having a cutout.

In a design according to FIG. 3, the cell connector 30 additionally exhibits, in addition to the fuse 36 which has a cutout 34, a mechanical convex portion 32 which compensates for mechanical vehicle vibrations. In this case, the cutout 34 is located in the upper region of the convex portion 32.

Figure 4:
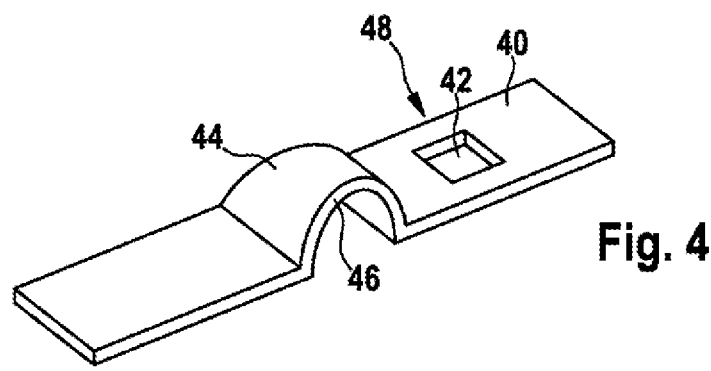
FIG. 4 shows a cell connector having a convex portion, a tapered portion and a cutout.

In FIG. 4, the fuse 48 is in the form of a combination of a convex portion 44, a tapered portion 46 and a cutout 42 which is positioned asymmetrically in relation to the convex portion 44 in the cell connector 40.

Figure 5:
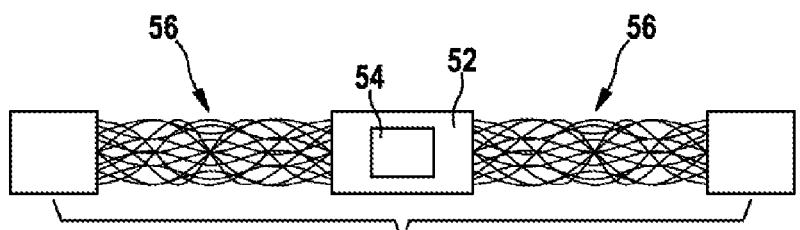
FIG. 5 shows a cable or fabric connector having an integrated fuse.

FIG. 5 shows the integration of a fuse 52, which is provided with a cutout 54, in an electrically conductive cable or fabric connector 56 which constitutes the cell connector 50.

Figure 6:
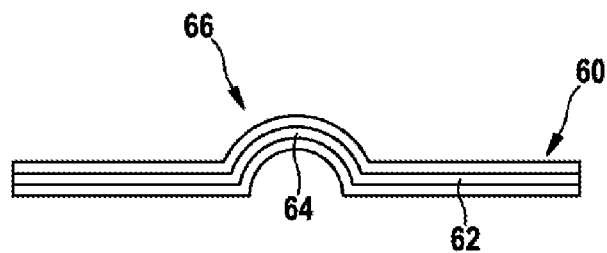
FIG. 6 shows a cell connector having a convex portion which comprises a plurality of sheet metal strips or metallic foil layers.

FIG. 6 presents a cell connector 60 comprising a plurality of layers of sheet metal strips or metallic foil layers 62 which are situated one on the other and having a convex portion 64 which constitutes the fuse 66. A cell connector 60 which is configured in this way has a relatively high mechanical strength. In this case, the sheet metal strips or foil layers 62 are fixedly connected to one another at the contact ends of the cell connector 60.

Figure 7:
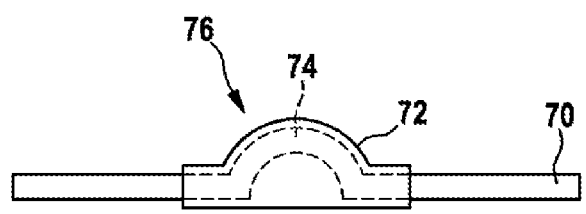
FIG. 7 shows a cell connector having a convex portion or a cutout, with the fuse being covered by a plastic.
Figure 8:
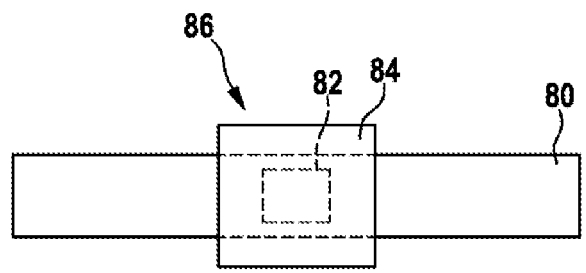
FIG. 8 shows a cell connector having a convex portion or a cutout, with the fuse being covered by a plastic.

FIGS. 7 and 8 show fuses 76, 86 having a convex portion 74 or a cutout 82, wherein the region of the fuses 76, 86 is covered by a plastic sheathing 72, 84.

Figure 9:
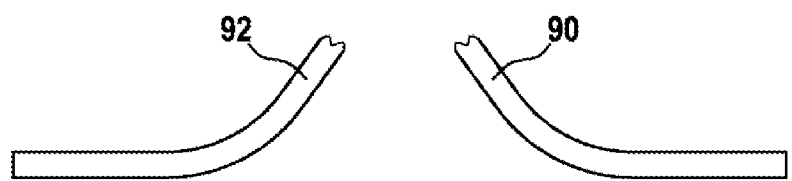
FIG. 9 shows a cell connector having fractions of its contact ends, which fractions move away from one another in the same direction or in opposite directions.
Figure 10:
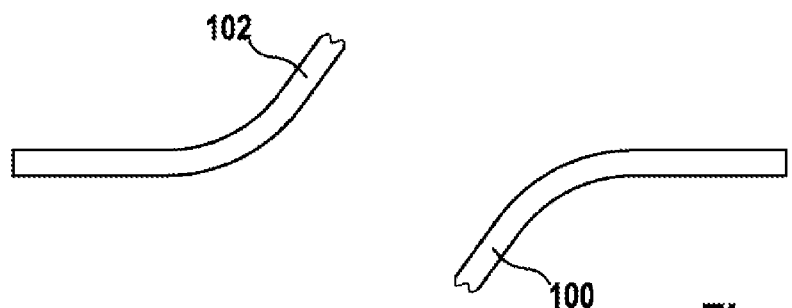
FIG. 10 shows a cell connector having fractions of its contact ends, which fractions move away from one another in the same direction or in opposite directions.

FIGS. 9 and 10 show how the fractions 90, 92, 100, 102 of a fuse extend away from one another when a short circuit has occurred. This is possible when the region of a fuse is kept under permanent mechanical prestress.

The invention claimed is:

1. A cell connector for a battery system having a plurality of lithium-ion cells, comprising:
a body that includes:
a first portion configured as a cable connector portion or a fabric connector portion;
a second portion configured as a cable connector portion or a fabric connector portion; and
a fuse integrated within the body between the first portion and the second portion.

2. The cell connector as claimed in claim 1, wherein:
the first portion includes a first contact end of the cell connector;
the second portion includes a second contact end of the connector; and
the fuse includes a cutout or a tapered portion that is defined by the body and that is located between the first and second contact ends.

3. The cell connector as claimed in claim 2, wherein:
the body further includes a compensation element that has a convex portion located between the first and second contact ends; and
the cutout or tapered portion is at a location external to the compensation element.

4. The cell connector as claimed in claim 2 wherein:
the fuse is configured such that a short circuit in the battery system causes the fuse to separate the first portion from the second portion; and
the cell connector is prestressed, such that separation of the first portion from the second portion by the fuse causes the first portion and the second portion to move away from each other due to the prestress.

5. The cell connector as claimed in claim 1, wherein the fuse has a plastic sheathing.

6. The cell connector as claimed in claim 1, wherein the body includes a plurality of layers of either sheet metal or metallic foil.

7. A battery, comprising:
a plurality of lithium-ion battery cells; and
a plurality of cell connectors, wherein each of the cell connectors includes:
a body that includes:
a first portion configured as a cable connector portion or a fabric connector portion;
a second portion configured as a cable connector portion or a fabric connector portion; and
a fuse integrated within the body between the first portion and the second portion;
wherein the lithium-ion battery cells are electrically connected to each other by at least one of the cell connectors.

8. A motor vehicle comprising:
a drive system;
a battery including a plurality of lithium-ion battery cells; and
a plurality of cell connectors, wherein each of the cell connectors includes:
a body that includes:
a first portion configured as a cable connector portion or a fabric connector portion;
a second portion configured as a cable connector portion or a fabric connector portion; and
a fuse integrated within the body between the first portion and the second portion;
wherein the lithium-ion battery cells are electrically connected to each other by at least one of the cell connectors; and
wherein the battery is connected to the drive system of the motor vehicle.

* * * * *